April 9, 1929. G. S. HELENBOLT 1,708,137
FRUIT GRADING MACHINE
Filed Aug. 16, 1921 5 Sheets-Sheet 2

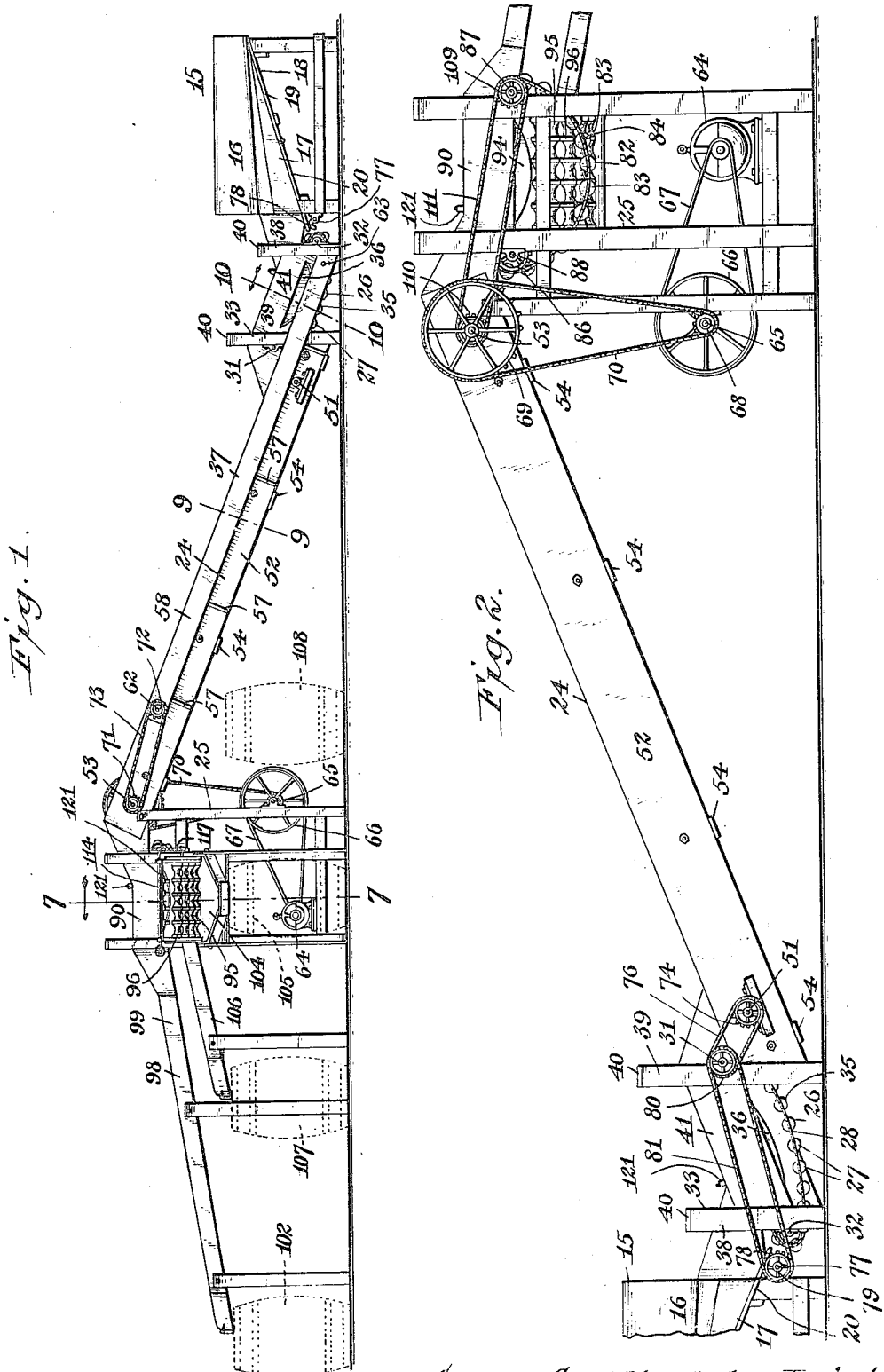

George S. Hellenbolt, Inventor.
By Emil Neuhard
Attorney.

Witness:
J. J. Oberst,

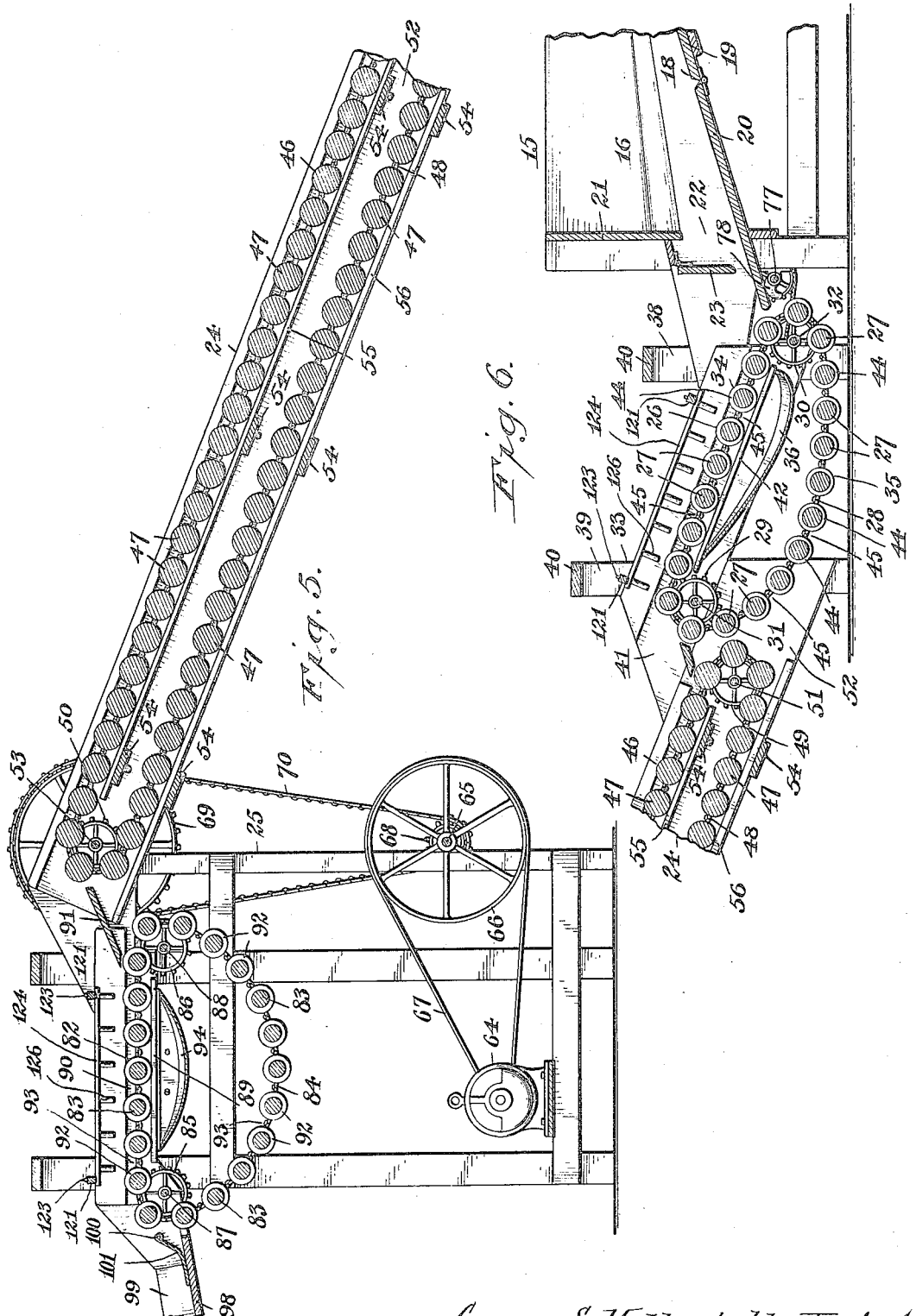

April 9, 1929.  G. S. HELENBOLT  1,708,137
FRUIT GRADING MACHINE
Filed Aug. 16, 1921  5 Sheets-Sheet 4
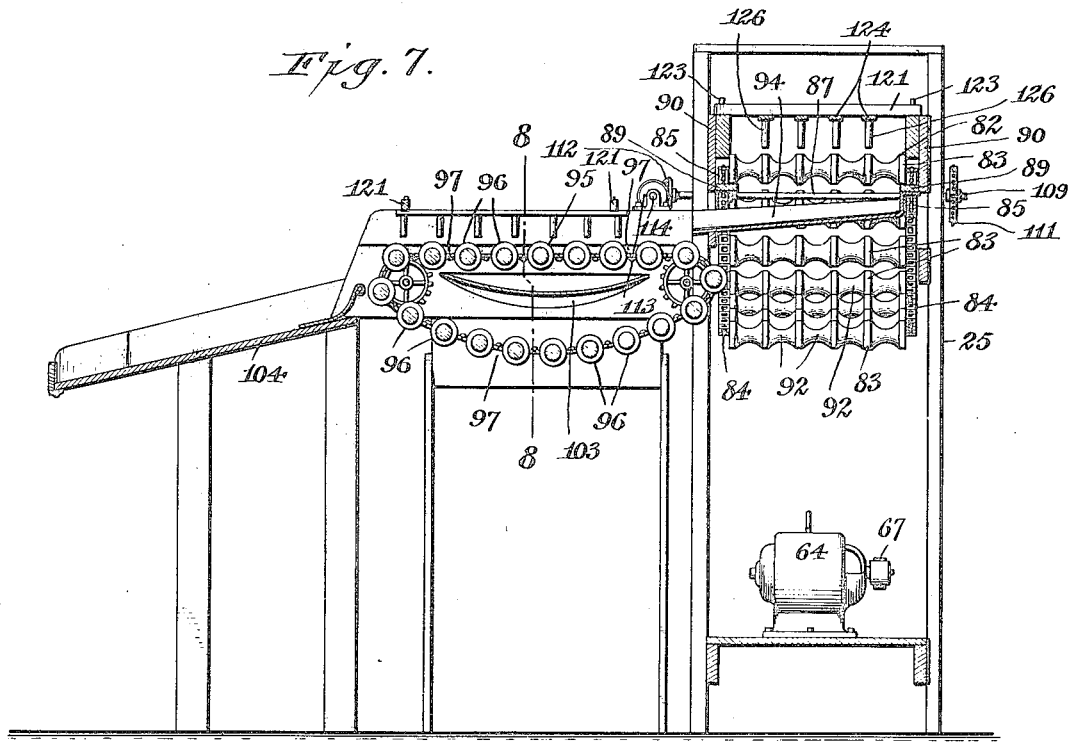
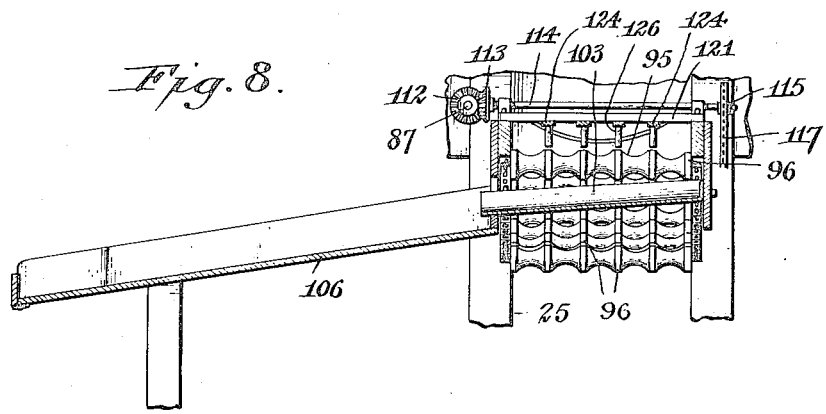
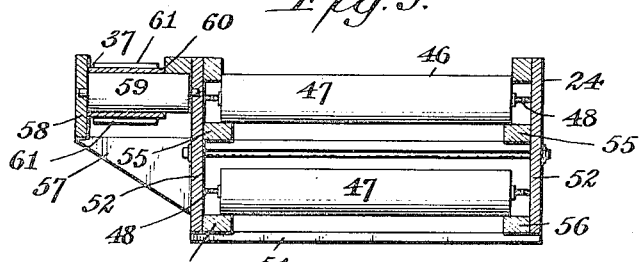

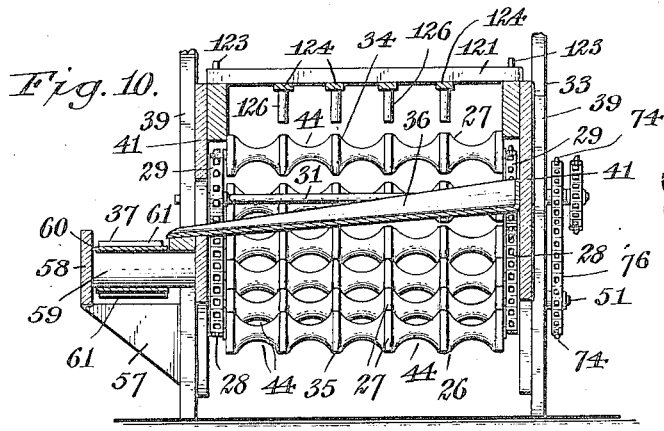
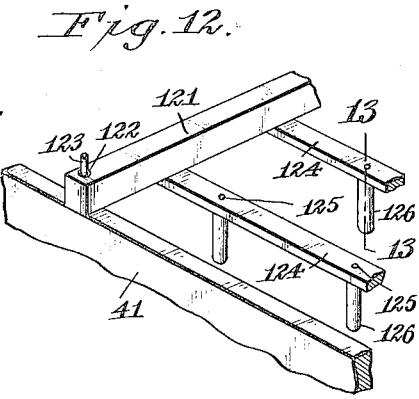
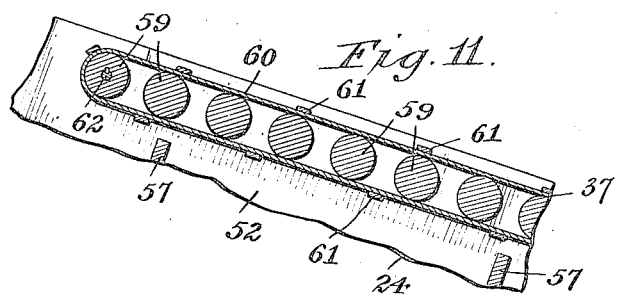
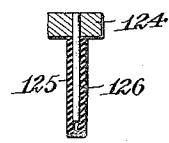
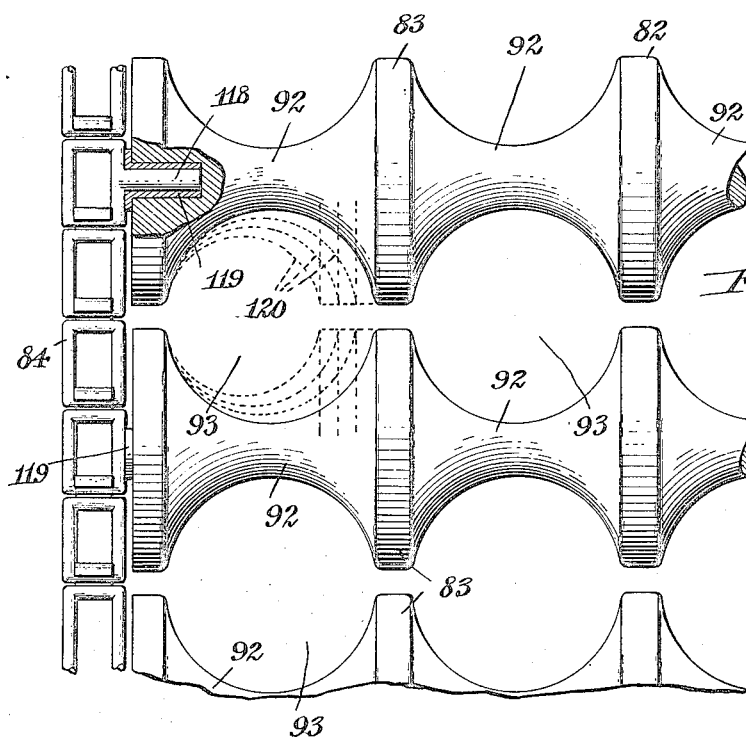

Patented Apr. 9, 1929.

1,708,137

UNITED STATES PATENT OFFICE.

GEORGE S. HELENBOLT, OF MIDDLEPORT, NEW YORK, ASSIGNOR, BY MESNE ASSIGNMENTS, TO NIAGARA SPRAYER AND CHEMICAL CO., INC., OF MIDDLEPORT, NEW YORK, A CORPORATION OF NEW YORK.

FRUIT-GRADING MACHINE.

Application filed August 16, 1921. Serial No. 492,644.

My invention relates to improvements in fruit grading machines.

The invention is particularly designed for grading or sizing apples and similar fruit.

In fruit grading machines now known, provision is made, in many of them, for separating the culls before grading or sizing the remainder of the fruit, but in each instance the largest size or choicest grade of fruit is delivered from the machine after having graded the smaller sizes, with the result that the largest size, or what is generally known as the choice fruit, is caused to be carried through the machine over a longer course than the smaller sizes or inferior grades, the largest size or choicest grade being thus subjected to rougher treatment than the smaller sizes or inferior grades, and many of the apples or other fruit of the choicest grade are therefore delivered from the machine in a bruised condition.

The primary object of this invention is to provide a grading machine in which the largest size or choicest grade, after removing or separating the culls, is disposed of first, with the result that the choicest fruit is caused to travel over the smallest course and each succeeding lower grade over a successively larger course, thus assuring the least handling for the better grades of fruit, and especially for the largest size or choicest grade.

Another object of my invention is to provide a fruit grader which will with equal facility grade all kinds of apples and other fruit, even through such apples or other fruit are considerably elongated, such as apples known as gilliflower and strawberry apples, which have their greatest dimension along a line passing through the stem and blow of the apple, whereas other kinds of apples have their greatest dimension crosswise or at a right angle to a line passing through the stem and blow.

A further object is, the production of a grading machine by means of which a larger quantity of fruit can be graded and packed in a given period of time than with sizing machines now in use.

A further object of my invention is the provision of a grading machine in which an elevator is provided, at one end of which the culls are delivered from the machine, and at the other end of which the largest apples are directed over grading mechanism and delivered from the machine, smaller sizes being continued on their course through the machine and delivered therefrom progressively according to size, the smallest size being delivered last.

A still further object of my invention is the provision of a machine for grading apples and other fruit, in which means is provided for sorting out the culls and in which provision is also made to enable attendants to see and remove all apples or other fruit which are bruised or otherwise considered defective, before commencing the actual grading operation, means being provided to tumble the fruit so that all parts thereof can be easily examined without handling.

A further object is to provide a machine of the type mentioned, to which grading units may be added, and the number of sizes of apples or other fruit to be graded, increased.

A still further object is to provide new and improved grading means; and to otherwise improve on grading machines now in use.

With the above and other objects in view, the invention consists in the novel features of construction and in the arrangement and combination of parts to be hereinafter described and more particularly pointed out in the subjoined claims.

In the embodiment of my invention shown,—

Fig. 1 is a side elevation of a machine constructed according to my invention.

Fig. 2 is a slightly enlarged view of a portion of the opposite side thereof.

Fig. 5 is an enlarged longitudinal section taken in a plane indicated by line 5—5, Fig. 3.

Fig. 6 is an enlarged longitudinal section taken on line 6—6, Fig. 3.

Fig. 7 is an enlarged transverse section taken on line 7—7, Fig. 1, looking in the direction of the arrow crossing said line.

Fig. 8 is a longitudinal section taken on line 8—8, Fig. 7.

Fig. 9 is an enlarged transverse section taken on line 9—9, Fig. 1.

Fig. 10 is an enlarged transverse section taken on line 10—10, Fig. 1.

Fig. 11 is an enlarged longitudinal section taken in a plane indicated by line 11—11, Fig. 4.

Fig. 12 is a perspective view of a portion of the fruit-turning means.

Fig. 13 is an enlarged section taken on line 13—13, Fig. 12.

Fig. 14 is a detail view of a portion of the mechanisms and a portion of the drive for the same.

Referring to the drawings in detail, like numerals of reference refer to like parts in the several figures.

Figure 3:
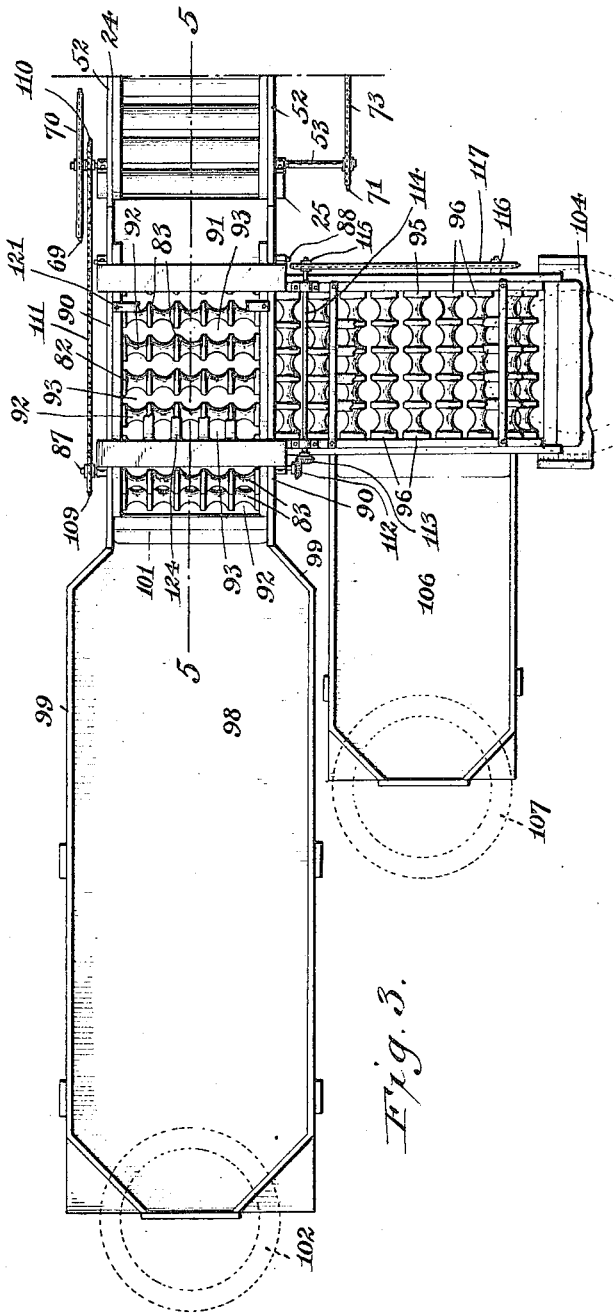
Fig. 3 is a plan view of one portion of the machine.
Figure 4:
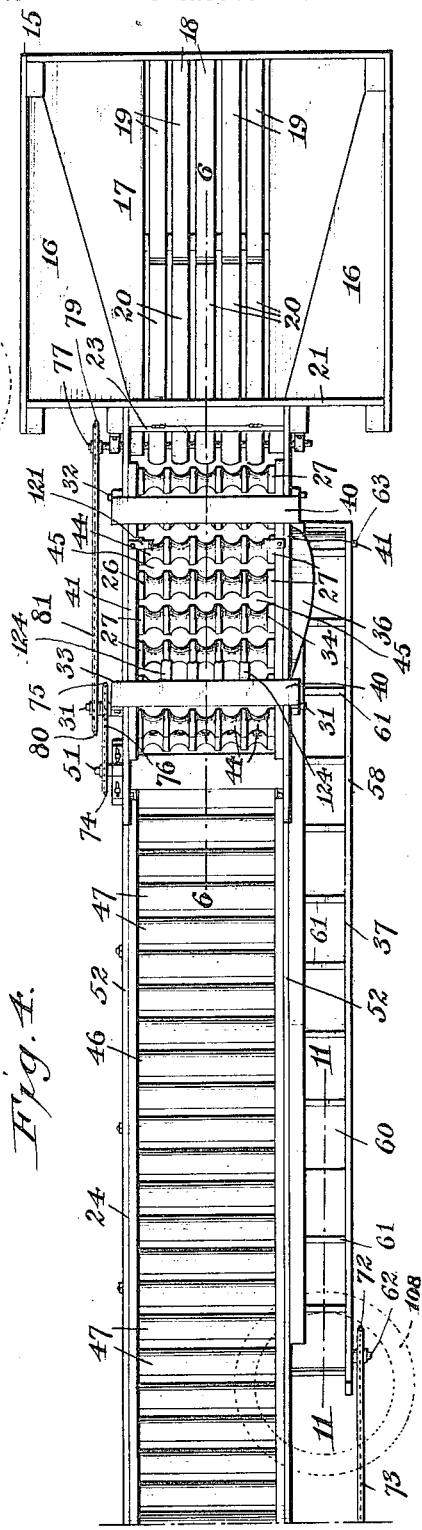
Fig. 4 is a plan view of the other portion thereof.

The reference numeral 15 designates a hopper or receiving box into which apples or other fruit to be sized or graded are delivered, said hopper or box being shown rectangular at its upper end and having the lower portions of its side walls 16 inclined. The bottom 17 is inclined, a portion thereof is formed of spaced slats 18, which are parallel, each slat comprising a fixed portion 19 and a movable or hinged portion 20. The movable or hinged portions are located at the lower end of the inclined bottom and are adapted to direct apples or other fruit from the hopper. At the delivery end of the hopper, a transverse wall 21 is provided, which is separated from the inclined bottom, or more particularly from the hinged portions 20 of the slats 18, by a delivery space 22 through which the apples or other fruit passing out of the hopper are directed. Hinged to said end wall 21 is a gate 23, said gate having a hanging position and being adapted to swing outwardly and upwardly to allow one layer only of apples or other fruit to pass out of the hopper at a time.

Since my invention is particularly designed for sizing or grading apples, I will hereinafter refer to apples as the fruit to be graded or sized; but it is to be understood that such a term is not used in a limited sense, since many other kinds of fruit and possibly other commodities may be graded or sized without even resorting to modifications falling fully within the scope of my invention.

24 designates an inclined feeding elevator having its lower end supported in a manner to be presently described, and its upper end fastened to a frame 25. Between the lower end of said elevator and said hopper, grading mechanism 26 is provided, said grading mechanism comprising in addition to other parts or elements, an endless series of grading rollers 27, opposite ends of which are rotatably secured to endless chains or carriers 28, which are preferably formed of connected sprocket links of special construction, to be hereinafter described, said chains or carriers being adapted to pass around sprocket wheels 29, 30, fastened to spaced parallel shafts 31, 32, respectively, journaled in suitable bearings in or on a framework 33 constructed to support said grading mechanism and the lower end of the elevator.

The sprocket wheels 29 are at a higher elevation than the sprocket wheels 30 so that the series of rollers comprise an upper inclined stretch 34 and a lower hanging stretch 35. The lower stretch is allowed to assume a hanging position in order to provide the necessary space between the two stretches of rollers for a laterally inclined chute 36. Said chute is formed of sheet metal, canvas, or other material and is constructed to direct the apples delivered thereon to an auxiliary elevator 37.

The framework 33 comprises front and rear uprights 38, 39, respectively, arranged at opposite sides of the grading mechanism 26, and the uprights at opposite sides are connected at their upper ends by transverse connector members 40 so as to provide a rigid frame capable of properly supporting said grading mechanism and parts associated therewith.

Fastened to the uprights 38 and 39 are inclined side boards 41, each having a guide track 42 secured to its inner side, along which the upper stretch of rollers 27 travels, thus keeping said stretch in a straight line and compelling said rollers to rotate due to opposite ends thereof traveling in frictional contact with said guide tracks.

Each of the rollers of the grading mechanism 26 is provided at regular intervals along its length with a series of annular concaved grooves 44, the grooves of the rollers being alined so as to form substantially circular grading or sizing openings or passages 45 between adjacent rollers.

The pivoted portions 20 of the slats 18 forming the bottom of the hopper have their lower ends extending over the lower portion of the grading mechanism 26, and apples passing out of said hopper are consequently delivered onto said grading mechanism and, due to the fact that the upper stretch of rollers travels upwardly, the apples are therefore, caused to travel upwardly on said rollers, all apples smaller than a given size, and known as culls, passing through the circular grading or sizing openings or passages and dropping down onto the inclined chute 36, from which they are directed laterally onto the lower end of the auxiliary elevator 37. All apples of a larger size than said grading or sizing openings or passages pass upwardly and are delivered from the upper end of said grading mechanism 26 onto the lower end of feeding mechanism 46 forming part of the feeding elevator 24. The term "cull" or "culls", as used in connection with the grading mechanism, is intended to mean apples or other fruits or commodities of a size so small that they are considered unusable for most purposes, or at least unsalable for general purposes.

The feeding mechanism 46 comprises an endless series of rollers 47 arranged transversely and parallel with the grading rollers 27 of the grading mechanism 26, which may be referred to as cull grading mechanism. Each of these rollers 47 is cylindrical from end to end and rotatably supported by endless chains or carriers 48, which pass around sprocket wheels 49, 50, respectively, the sprocket wheels 49 being fastened to a shaft 51 journaled in side boards 52 forming part of the elevator and having their upper ends secured to the framework 25 and their lower ends fastened to the uprights 38 of the framework 33.

The sprocket wheels 50 are secured to a shaft 53 also journaled in said side boards near their upper ends. Connecting said side boards are transverse connector members 54 arranged at intervals along the length of said boards, and fastened to the inner side of each of said boards are roller-supporting tracks 55, 56, the supporting tracks 55 being adapted to support and cause the upper stretch of rollers of said feeding mechanism to rotate while the lower supporting tracks 56 support the lower stretch of rollers of said feeding mechanism.

Apples delivered onto the feeding mechanism 46 from the cull-grading mechanism 26 are carried upward by the rollers 47 and due to the ends of said rollers traveling in frictional contact with the roller supporting tracks 55 or 56 and being rotated thereby, the apples carried by the upper stretch of rollers will be continually turned over or tumbled gently so that an attendant stationed at the side of the elevator 24 will be able to examine the same without handling and thus remove all defective apples.

Fastened to one of the side boards 52 of the elevator 24 are transverse supporting members 57, which are arranged at intervals along said side board, and to the outer ends of said transverse supporting members 57 a side board 58 is secured in which, and the side board 52, last-mentioned, a longitudinal series of rollers 59 is journaled, said rollers being spaced apart and having an endless belt of canvas or other suitable material 60 traveling above and beneath the same, said belt having transverse slats 61 secured to its outer side.

The uppermost roller of the series 59 is secured to a shaft 62 journaled to rotate in the side board 58 and the adjacent side board 52 of the feeding elevator 24, while the lowermost roller of said series is secured to a shaft 63 also journaled in said last-mentioned side boards 52 and 58.

Fastened to the framework 25 is an electric motor 64, and journaled in suitable brackets fastened to said framework is a shaft 65 having a pulley 66 secured thereto, around which pulley and the pulley of said motor, a belt 67 is passed. Secured to said shaft 65 is a sprocket wheel 68, around which and a sprocket wheel 69 secured to the shaft 53, a sprocket chain 70 is passed. On the shaft 53 at the upper end of the feeding elevator is a second sprocket wheel 71, around which and a sprocket wheel 72 secured to the shaft 62 at the upper end of the auxiliary elevator, a sprocket chain 73 is passed. It will be clear therefore that the shaft 53 at the upper end of the feeding elevator 24 is rotated by the motor 64 through the medium of the belt 67, pulley 66, shaft 65, sprocket wheel 68, sprocket chain 70, and sprocket wheel 69, and that the feeding elevator and the auxiliary elevator are both driven from said shaft 53; the feeding elvator 24 being driven directly by said shaft and the auxiliary elevator through the medium of the sprocket wheel 71, sprocket chain 73, and sprocket wheel 72.

Secured to the shaft 51 at the lower end of the feeding elevator 24 is a sprocket wheel 74, around which and a sprocket wheel 75 secured on the shaft 31 at the upper end of the cull-grading mechanism is a sprocket chain 76, thus the cull-grading mechanism is operated from the lower end of the feeding elvator.

Secured to the frame of the hopper 15 is a shaft 77, on which is secured a transverse series of agitating cams or arms 78, which are adapted to successively engage and lift, and then move away from the lower ends of the hinged lower portions of the slats 18 forming the bottom of said hopper so as to permit said slats to descend, and in order to rotate said shaft, a sprocket wheel 79 is secured thereto, around which and a second sprocket wheel 80 on the shaft 31 at the upper end of the cull-grading mechanism, a sprocket chain 81 is passed; thus the agitating mechanism whereby the lower portions of the slats are caused to swing on their hinges, is driven from the upper end of the cull-grading mechanism. Apples rolling down along the bottom of the hopper are therefore agitated so that only a single layer of apples will be fed onto the lower end of the cull-grading mechanism 26, of which additional assurance is had by reason of the employment of the pivoted gate 23.

The frame 25 by means of which the upper end of the elevator 24 is supported, is constructed to properly support grading or sizing mechanism 82. Said grading or sizing mechanism is adapted to receive the apples from the upper end of the feeding elevator 24, and comprises an endless series of grading rollers 83 supported by and journaled to rotate on endless sprocket chains 84 passing over spaced sprocket wheels 85, 86, which are secured to spaced parallel shafts 87, 88, respectively, journaled in suitable bearings secured to the frame 25. Like the cull-grading mechanism, this grading or sizing mechanism has an upper straight-line stretch of rollers and a lower hanging stretch of rollers, and in this instance the rollers of the mechanism are arranged transversely of the machine, or parallel to the framework 25. The upper stretch of rollers are maintained in a straight line by guide tracks 89 fastened to side boards 90 secured to the farmework 25. The upper stretch of said rollers is positioned in a plane slightly beneath the upper end of the feeding elevator 24 and an inclined feed board 91 extends from the upper end of the endless series of feed rollers of said elevator onto or in close proximity to the upper stretch of rollers, serving to deliver the apples from said feed rollers onto the series of rollers 83.

It may here be noted that each of the grading rollers is provided with a longitudinal series of annular concaved grooves 92, and that the grooves of said rollers are alined so that those of adjacent rollers form substantially circular grading openings or passages 93 through which are passed all apples delivered onto the upper stretch of rollers and moving rearwardly, which are of a size smaller than said openings. By thus grooving the rollers, a transverse series of grading openings is formed between adjacent rollers and each of such openings serves to grade fruit in two directions or along two dimensions thereof.

My improved grading or sizing machine includes a plurality of grading mechanisms, such as above described, and all such mechanisms are substantially of the same construction and arrangement, except that the grading openings between the rollers are of different sizes; which difference in sizes may be created by solely concaving the rollers to a greater or lesser depth and along a greater length, or by both increasing the depth of the concavities of the rollers and separating the rollers slightly further apart.

Like the cull-grading mechanism, the grading mechanism 82 has the upper stretch of rollers spaced a distance from the lower stretch to enable the use of a transversely-inclined chute 94, which receives and directs apples passing through the grading openings 93 and deposits them onto a third grading mechanism 95, said third grading mechanism being mounted on the frame 25 but being at a lower elevation than the grading mechanism 82 and to one side of the latter.

The grading rollers 96 of the grading mechanism 95 are similar to the rollers of the grading mechanism 82 and the rollers of the cull-grading mechanism 26 with the exception that the size of the grading openings or passages 97 between adjacent rollers are smaller than the grading openings or passages 93 of the grading mechanism 82 and larger than the grading openings or passages 45 of the cull-grading mechanism 26. Furthermore, the rollers of the grading mechanism 95 are arranged longitudinally or at right angles to the rollers of the grading mechanism 82. The chute 94 of the grading mechanism 82 delivers the apples onto the upper straight-lined stretch of rollers of the grading mechanism 95.

Reverting to the grading mechanism 82, I desire to state that all apples too large to pass through the grading openings 83 of said mechanism, are directed rearwardly and delivered onto an inclined table 98 arranged lengthwise and having its receiving end secured to the framework 25, said table having upstanding sides 99 and a cross bar 100 secured to said sides at its receiving end. Secured to said cross bar is a piece of canvas or other similar material 101, which hangs therefrom, and provides a cushion onto which apples delivered from the grading mechanism 82 are dropped. The apples delivered onto the table 98 are the largest or choicest grade of those passing through the several grading mechanisms. The table 98 delivers the apples into a barrel 102, or other receptacle.

Underneath the lower stretch of rollers of the grading mechanism 95, a longitudinally-inclined chute 103, similar to the chutes 36 and 94, is positioned, and this chute receives all apples of a size small enough to pass down through the grading openings or passages 97, while all other apples delivered onto the grading mechanism 95 too large to pass through said grading openings or passages 97 are passed on along to the end of said grading mechanism and are delivered onto an inclined table 104, from which the apples are deposited into a barrel or other receptacle 105 arranged at the lower or outer end of said table.

The apples passing through the openings 97 of the grading mechanism 95 and falling onto the inclined chute 103 are delivered by the latter onto an inclined table 106 arranged lengthwise or parallel with the inclined table 98, and at the lower or outer end of said table the apples delivered thereonto are deposited into a barrel or other receptacle 107.

The culls conveyed upwardly by the auxiliary elevator 37 are delivered from the upper end thereof into a barrel 108 positioned beneath said upper end.

It will be apparent that the grading mechanisms may be increased or diminished in number, and while for grading apples the arrangement shown enables the culls to be separated from the remaining apples and the remaining apples to be graded into three lots; some fruit, such as oranges, may require grading into a larger number of lots, and it is therefore apparent that the inclined chute 102 of the grading mechanism 95 may be arranged to deliver onto another grading mechanism, and that a number of additional grading mechanisms may be added. Each of the additional grading mechanisms will in all cases be arranged at a right-angle to the one preceding.

By arranging the successive grading mechanisms at right angles to each other, it is possible to group them in a comparatively small space by directing the chutes of the transversely feeding grading mechanisms both forwardly and rearwardly. For example, the grading mechanism 95 has its chute 103 directed rearwardly onto the table 106 and delivers apples larger than the grading openings or passages 97 therein onto the table 104, but if additional grading mechanisms were to be employed, the table 106 would be dispensed with and in place thereof, grading mechanism similar to those shown and described, substituted therefor. Such grading mechanism would be arranged at a right-angle to the grading mechanism 95 so that it would receive the apples directed over the outer end of the upper stretch of the rollers forming said grading mechanism 95. The chute of the added grading mechanism would be directed laterally, similar to the chute of the grading mechanism 82; that is to state, it would be directed transversely either to the right or left. If still another grading mechanism were employed, it would be arranged to feed transversely, similar to the grading mechanism 95 and the chute thereof may be directed forwardly or rearwardly, as will be found most convenient or utilize the floor space to best advantage. It is of course to be understood that the successive grading mechanisms are arranged in successively lower planes. Consequently, where a greater number of grading mechanisms are used than shown in the drawings hereof, the first grading mechanism at the upper end of the feeding elevator would be arranged at a higher elevation than shown, necessitating a greater inclination to said elevator.

In order to operate the grading mechanism 82, a sprocket wheel 109 is secured to one end of the shaft 87, and a sprocket wheel 110 alined therewith is secured to the shaft 53 at the upper end of the feeding elevator 24, a sprocket chain 111 being passed around said sprocket wheels 109 and 110.

At the opposite end of the shaft 87, a bevel gear wheel 112 is secured, which meshes with a bevel gear wheel 113 fastened to one end of a shaft 114 suitably journaled in bearings secured to the upper edge of the side boards of the grading mechanism 95, said shaft 114 being therefore arranged at a right angle to shaft 87 and having at its other end a sprocket wheel 115, around which and a sprocket wheel 116 secured to one of the shafts of the grading mechanism 95, a sprocket chain 117 is passed. The grading mechanism 82 is therefore operated from the shaft 53 at the upper end of the feeding elevator 24 through the medium of the sprocket wheel 110, the sprocket chain 111, and the sprocket wheel 109, and the grading mechanism 95 is operated from the shaft 87 of the grading mechanism 82 through the medium of the bevel gear wheels 112, 113, shaft 114, sprocket wheel 115, sprocket chain 117 and sprocket wheel 116.

The shaft 53 at the upper end of the feeding elevator 24 may be referred to as a central or centralized driving element, from which the operating parts at the lower or feeding end of the machine are operated, and also the successive grading mechanisms at the upper end of the machine.

By reason of the grading rollers of the several grading mechanisms having their ends traveling in frictional contact with guide tracks, said rollers are rotated and cause the apples carried thereby to be turned over and passed through the grading openings between the rollers according to size transversely, or at right angles to a line passing through the stems and blows thereof.

While I have not designated by numerals the chains for supporting the grading rollers and other elements of the grading mechanism 95, although the grading rollers thereof are particularly referred to by numerals, it is to be understood that the parts of the grading mechanism 95 are exactly like those of the grading mechanism 82.

Each of the chains by which the series of grading rollers of each grading mechanism are carried, is of a length to permit the lower portion thereof to sag between the sprocket wheels around which it passes so as to furnish sufficient space between the upper and lower stretches of rollers for the chute positioned between the said stretches.

Each of the chains or carriers for the grading rollers comprise connected links, as best shown in Fig. 14, certain links being provided with inwardly extending stub axles 118, which are entered in bushings 119 axially fitted into the ends of said grading rollers. Said rollers are therefore properly supported and capable of rotation on said stub axles.

In Fig. 14 I have shown in dotted lines at 120, the different sizes of grading openings or passages that may be employed and the manner in which said openings are formed.

Certain kinds of apples, for instance gilliflower and strawberry apples have their greatest dimensions along a line passing through the stems and blows of the same, but such apples must be graded according to their dimensions transversely or at right angles to planes passing through the stems and blows. Consequently, in order to prevent improper grading of such elongated apples, provision must be made to turn said apples if positioned sidewise so that they travel lengthwise in the direction of the part supporting the same, and so that they are compelled to pass downwardly through the grading openings or passages of the grading mechanisms, either stem end or blow end first. For this purpose, spaced transverse supporting members 121 are arranged over each of the grading mechanisms, each of said transverse supporting members having openings 122 at opposite ends through which pins 123 extend that are fastened into the upper edges of the side boards of said grading mechanism, it being understood that all grading mechanisms employed have side boards similar to the side boards 41 of the cull-grading mechanism.

The spaced transverse supporting members 121 of what may be termed the apple turning means, are connected by a plurality of longitudinal strips 124, which are positioned directly over the grading rollers between the annular grooves therein, each of said strips 124 having a plurality of depending pins 125 covered with rubber, felt, or other tubes 126 so that apples coming in contact therewith will not become bruised.

When apples of an elongated type are being passed through the machine, one or the other end portion of each apple may come in contact with one of the pins, and in each case the apple will be momentarily stopped in its course by said pin while the grading rollers continue to travel in a forward direction. The forward traveling movement of said grading rollers will, due to the frictional contact of the apple therewith cause the apple to be turned into a position at right angles to that in which it was momentarily halted, the spaces between the pins 125 arranged in transverse planes being large enough to permit the apples to pass between them when positioned lengthwise, or with its stem and blow in the line of travel, and apples larger than the grading openings or passages between adjacent rollers will be carried rearwardly over the end of the grading mechanism, while those whose dimensions transversely are small enough to pass through the grading openings or passages will, if positioned lengthwise, tip downwardly into the spaces between the alined concaved grooves of adjacent rollers and pass through the grading openings or passages formed by such grooves.

By means of the construction shown and described, the apple turning mechanism comprising the transverse members 121, the longitudinal strips 124, and the cushioned pins 125, may be removed when grading the general run of apples, which have a greater dimension transversely than lengthwise, as it is simply necessary to lift the device from the pins 123.

While I have shown an electric motor and chain-and-sprocket driving means for operating the parts of the machine, it is to be understood that any other source of power or driving means may be substituted for those shown, and that the arrangement of driving the various parts may also be changed without departing from my invention. Nevertheless, I consider the form of drive shown, in which a centralized driving element is employed and from which parts at opposite ends of the machine are driven, to be highly desirable, comparatively inexpensive, and one by means of which the power employed is utilized to the greatest advantage.

For convenience, I wish to refer to that portion of each grading mechanism onto which the fruit is delivered from another part of the machine, as the receiving end, and that portion over which the apples are passed which are not small enough to drop through the grading openings or passages thereof, as the delivery end of the mechanism, and in this connection I desire to state that the endless series of grading rollers forming the essential part of each grading mechanism is driven from the delivery end of such mechanism, thus creating a pulling action at the rear end of the upper stretch of grading rollers and assuring a straight-lined upper stretch under all conditions of use, making it impossible for the said rollers to become buckled so as to change the size of the grading openings or passages between adjacent rollers.

By driving each endless series of rollers from the delivery end of the grading mechanism, assurance is had at all times that the rollers of the upper stretch will be maintained uniform distances apart, thereby avoiding any variation in the grading openings or passages from front to rear of the upper stretch of rollers.

Having thus described my invention, what I claim is:—

1. A fruit-grading machine, comprising a hopper having an inclined bottom formed at least in part of spaced slats provided with hinged lower portions, cams for operating said hinged lower portions, an elevator adapted to receive fruit from said inclined bottom, a frame by which the upper end of said elevator is carried, grading means on said frame adapted to receive fruit from said elevator, means for operating said grading means from said elevator, and means for operating said cams from said elevator.

2. A fruit-grading machine, comprising a frame, cull-grading mechanism carried by said frame, a second frame, grading mechanism carried by said second frame at an elevation higher than that of said cull-grading mechanism, an elevator receiving fruit from said cull-grading mechanism and having its lower end secured to said first-mentioned frame and its upper end secured to said second-mentioned frame, said elevator being adapted to deliver fruit onto the grading mechanism carried by said second-mentioned frame.

3. A fruit-grading machine, comprising two spaced grading mechanisms arranged at different elevations, the lower of said grading mechanisms being adapted to grade culls, a conveyer connecting said grading mechanisms, and adapted to receive the fruit freed of culls and deliver the same to the elevated grading mechanism, and an auxiliary elevator adapted to receive the culls and carry the same to a high point to be delivered into barrels or other receptacles.

4. A fruit-grading machine, comprising cull grading mechanism, an inclined elevator receiving fruit from said cull grading mechanism and comprising an endless series of immovably spaced traveling rollers, and grading mechanism at the upper end of said elevator receiving fruit therefrom, said last-mentioned grading mechanism being arranged to pass the largest size of fruit thereover and to permit the passage therethrough of all remaining fruit.

5. A fruit-grading machine, comprising cull grading mechanism, means for delivering the culls laterally from said grading mechanism, an elevator having spaced side boards and feeding mechanism between said side boards receiving all fruit freed of culls from said cull grading mechanism, an auxiliary elevator secured to one of the side boards of said first-mentioned elevator and receiving the culls delivered laterally from said cull grading mechanism, said auxiliary elevator being adapted to deliver the fruit from its upper end into a barrel or other receptacle, and grading mechanism at the upper end of said first-mentioned elevator.

6. In a fruit-grading machine, the combination with a frame, of a plurality of grading mechanisms arranged at a right angle one with respect to another and in successively lower planes, each grading mechanism comprising parallel grooved rollers, the grooves of adjoining rollers forming grading openings or passages through which all fruit smaller than a given size are passed, all fruit larger than said given size delivered onto each grading mechanism being delivered from said grading mechanism without passing through said grading openings or passages thereof.

7. A fruit-grading machine, comprising cull grading mechanism, upwardly and forwardly directed feeding means extending from said cull grading mechanism, a frame to which the upper end of said feeding means is secured, and a pair of grading mechanisms arranged in different horizontal planes, the higher of which receives fruit from said feeding mechanism and delivers fruit onto the lower while disposing of the largest size of fruit, said lower grading mechanism dividing fruit delivered thereon into two lots of different sizes.

8. A fruit-grading machine, comprising cull grading mechanism, an elevator, a pair of grading mechanisms at the upper end of said elevator, means for driving said elevator from the upper end thereof, means for driving said cull grading mechanism from the lower end of said elevator, means for driving one of said pair of grading mechanisms from the upper end of said elevator, and means for driving the other of said pair of grading mechanisms from said last-mentioned grading mechanism.

9. Grading-mechanism, comprising two traveling endless carriers spaced apart and having inwardly extending stub axles at regular intervals along said carriers, immovably spaced rollers rotatably mounted at opposite ends on said stub axles, each roller having a longitudinal series of annular grooves therein forming grading openings or passages between adjacent rollers, and means for causing said carriers to travel.

10. A fruit-grading machine, comprising an elevator, a longitudinal series of spaced rotatably-supported rollers, an endless belt surrounding said endless series of rollers and having slats on its outer surface, cull grading mechanism at the lower end of said elevator, grading mechanism spaced from said cull grading mechanism, and means to deliver the fruit freed of cull from said cull grading mechanism to said second-mentioned grading mechanism.

11. A fruit-grading machine, comprising cull grading mechanism, an elevator directed forwardly and upwardly from said cull grading mechanism, an auxiliary elevator adapted to receive culls graded from the fruit by said cull grading mechanism, a frame supporting the upper end of said first-mentioned elevator, grading mechanism on said frame, a motor on said frame, means for driving said first-mentionel elevator from said motor, means for driving said auxiliary elevator from said first-mentioned elevator, means for driving said cull grading mechanism from the lower end of said elevator, and means for driving said second-mentioned grading mechanism from the upper end of said elevator.

12. In a fruit-grading machine, fruit grading mechanism comprising a frame, side boards secured to said frame, traveling grading mechanism positioned between said side boards and comprising a series of spaced rollers having grading openings or passages therebetween, turning mechanism carried by said side boards and having depending elements arranged in a plurality of longitudinal series positioned between the grading openings or passages of said rollers.

13. A fruit-grading machine, comprising a series of traveling grading rollers spaced apart, each roller having a longitudinal series of circumferential grooves forming grading openings between adjacent rollers, spaced transverse members supported above said grading rollers, longitudinal members secured to said transverse members and disposed in planes above said rollers and between the grading openings therebetween, pins depending from said longitudinally-disposed members, and cushioning means around said pins.

14. A fruit-grading machine, comprising an endless series of grading rollers, means for causing said rollers to travel and rotate, each of said rollers having a longitudinal series of circumferential grooves therein forming grading openings between adjacent rollers, a pair of spaced side boards between which said rollers are positioned, pins projecting upwardly from the upper edges of said side boards, spaced transverse members having openings at opposite ends in which said pins are adapted to loosely fit, longitudinally-disposed members secured to the under side of said transverse members and positioned in planes between the grooves of said rollers, and depending pins arranged at intervals along each of said longitudinally-disposed members.

15. In a fruit-grading machine, the combination of a hopper having an inclined bottom provided with a hinged portion, grading mechanism spaced from said hopper, means between said hopper and said grading mechanism for freeing the fruit of culls and delivering the fruit to said grading mechanism, and means for actuating the hinged portion of said bottom.

16. In a fruit-grading machine, the combination of an inclined support for the fruit having a movable portion at its lower end, an elevator receiving the fruit from said support, grading mechanism adapted to receive the fruit from said elevator and having movable parts, operating means for moving said parts, and means actuated by said operating means for shaking said support.

17. In a fruit-grading machine, the combination of a hopper having an inclined bottom provided with a hinged portion, grading mechanism situated in a higher plane than the lower end of said inclined bottom, an elevator receiving fruit from said hopper and adapted to deliver the same to said grading mechanism, and means operated from said elevator for actuating the hinged portion of said bottom.

In testimony whereof I affix my signature.

GEORGE S. HELENBOLT.